United States Patent
Baturka

[15] 3,652,100
[45] Mar. 28, 1972

[54] COLLET CHUCK
[72] Inventor: Walter Baturka, Frankenmuth, Mich.
[73] Assignee: Houdaille Industries, Inc., Buffalo, N.Y.
[22] Filed: July 2, 1970
[21] Appl. No.: 51,885

[52] U.S. Cl. ................................................279/51, 279/47
[51] Int. Cl. .........................................................B23b 31/20
[58] Field of Search ......................279/43, 47, 50, 48, 51, 52

[56] References Cited

UNITED STATES PATENTS 3,365,204  1/1968  Benjamin et al. .........................279/51

Primary Examiner—Francis S. Husar
Attorney—Hill, Sherman, Meroni, Gross & Simpson

[57] ABSTRACT

A collet chuck assembly includes a locknut and a nose ring that have confronting bearing races with a series of bearing elements therebetween, the nose piece and the collet having a line of engagement, and loose fitting threads enabling the line of engagement to find its own location.

8 Claims, 1 Drawing Figure

PATENTED MAR 28 1972
3,652,100
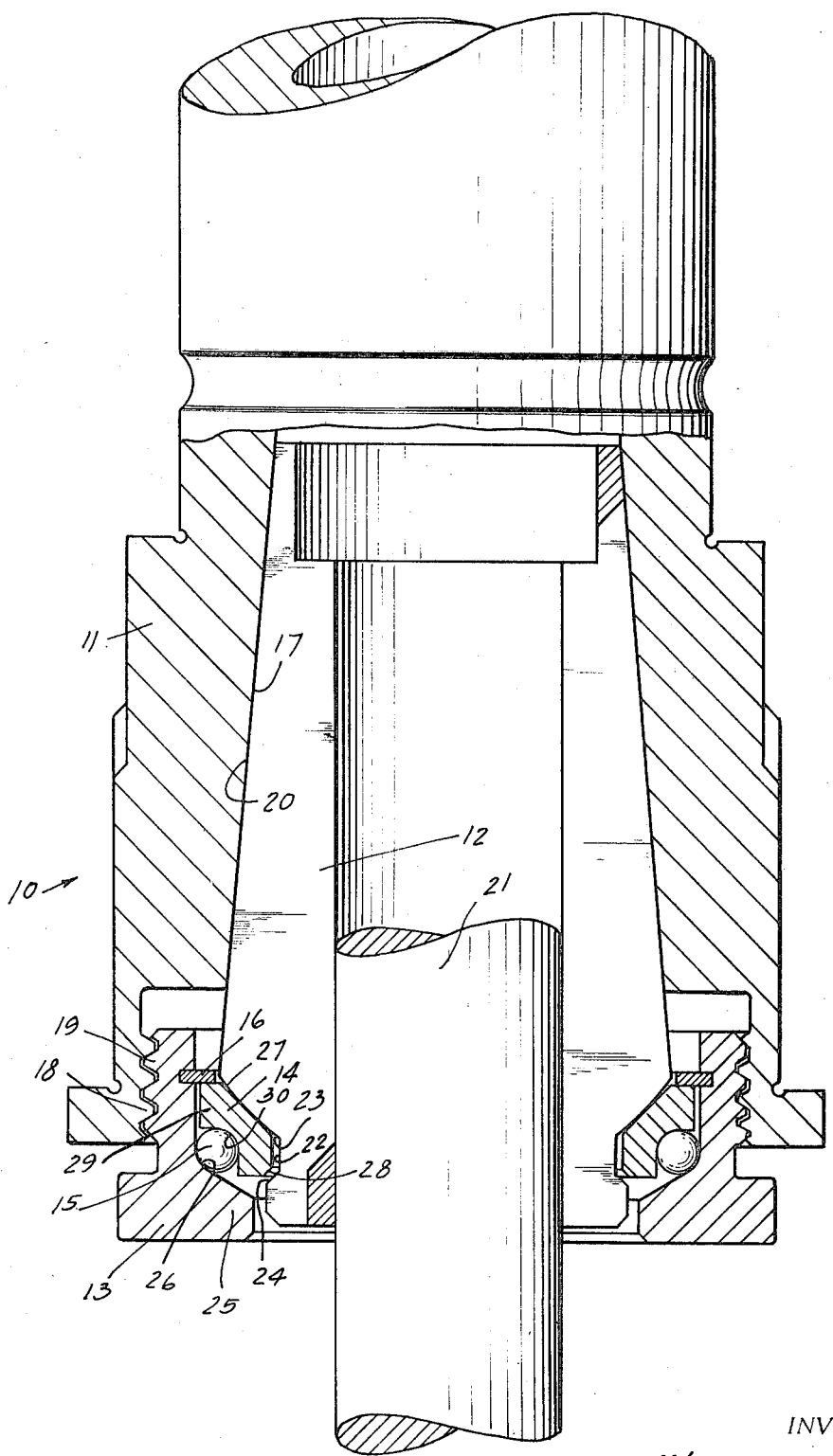
INVENTOR.
WALTER BATURKA
BY Hill, Sherman, Meroni, Gross & Simpson ATTORNEYS

COLLET CHUCK

BACKGROUND

1. Field of the Invention

This invention relates generally to a collet chuck in which a tool is gripped by a contractible collet.

2. Prior Art

With the advent and commercial success of numerically controlled machine tools, manufacturers have provided components to be manufactured which have much more complexity than previously was the case. When a great deal of complexity is built into a component, its machining cost goes somewhat higher so that if, during the latter part of its manufacture, there is any kind of error that takes place, the cost of the rejected part becomes substantial. One of the types of machining error that can occur is that a tool might slip in the collet chuck that holds it, and therefore a machining error is produced due to such tool slippage. Operators of such machine tools therefore, in a spirit of an abundance of caution, have tightened the locknuts of collet chucks somewhat tighter than previously was considered necessary. The operator thus wants to be absolutely certain that the tool does not slip. However, not infrequently, a strong operator can over-tighten the locknut to the extent that he considers necessary, but which frequently is a degree of torque way beyond that for which the collet chuck was designed to withstand.

At least one commercial device with which I am familiar is susceptible to this type of damage because critical parts are subjected to shear forces which they cannot withstand, and thus damage to the tooling results.

Further, over-torquing has tended to cause radial displacement of the collet in prior designs, thereby destroying the original concentricity.

SUMMARY OF THE INVENTION

According to my invention, a collet chuck assembly is provided wherein a locknut has a radially inwardly projecting flange that serves as a bearing race, a nose ring that has a radially outwardly projecting flange serving as a bearing race and which radially overlaps the locknut flange, a series of bearings being trapped therebetween, the collet having a spherical surface engaged by a frusto-conical surface on the nose ring to provide a line of contact which can shift about to center itself, such centering being aided by loose-fitting threads on the locknut.

Accordingly, it is an object of the present invention to provide a collet chuck which can withstand greater tightening forces without damage.

A further object of the present invention is to provide a collet chuck assembly that will have improved gripping power on the shank of the tool.

Yet another object of the present invention is to provide a collet chuck assembly that is so constructed that there will be no tendency for causing radial displacement of the collet whereby maximum concentricity at the collet is ensured.

A still further object of the present invention is to provide a collet chuck having bearings for facilitating tightening, and in combination therewith having a nose ring so arranged that only compressive forces are applied by the bearings thereto.

Many other advantages, features and additional objects of the present invention will become manifest to those versed in the art upon making reference to the detailed description and the accompanying drawing in which a preferred structural embodiment incorporating the principles of the present invention is shown by way of illustrative example.

ON THE DRAWING

The single figure is a cross-sectional view, partially broken away, of a collet chuck assembly provided in accordance with the principles of the present invention.

AS SHOWN ON THE DRAWINGS

The principles of the present invention are particularly useful when embodied in a collet chuck assembly such as illustrated in the drawing, generally indicated by the numeral 10. The chuck includes a housing 11, a collet 12, a locknut 13, a nose ring 14, a series of bearing elements 15 such as ball bearings, and a retainer ring 16.

The housing 11 has a cam surface 17 against which the collet 12 is disposed. The housing 11 also has a set of threads 18 which fit loosely with a set of threads 19 on the locknut 13. The loose fit is achieved by making the pitch diameter of the inner threads 19 somewhat smaller than usual with respect to the threads 18, thereby enabling the locknut 13 to rock slightly when the threads are engaged.

The collet 12 is slotted from opposite ends so that its size can be contracted, and such contraction is obtained by forcing the collet 12 in an axial direction so that the cam surface 17 on the housing coacts with a correspondingly shaped surface 20 on the various sections of the collet 12 to force the collet 12 to a smaller size where it can securely grip a shank 21 of a tool such as a drill or reamer.

The collet 12 has means that defines a peripheral groove 22, which here comprises a spherical surface 23 and a frusto-conical surface 24.

The locknut 13 has a groove within which the retainer ring 16 is removably received. The locknut 13 also has a radially inwardly projecting flange 25 which has a portion serving as a bearing race 26 for the series of bearings 15.

The nose ring 14 has a frusto-conical portion 27 which is normally disposed against the spherical surface 23 of the collet 12, and a further frusto-conical portion 28 for engaging the frusto-conical portion 24 of the collet 12. The surface 27 and the surface 28 of the nose ring 14 extend into the groove 22. The nose ring 14 has a radially outwardly projecting flange portion 29 which has a surface that serves as a bearing race 30 for also engaging the series of bearings 15. At its axially inner end, the nose ring 14 is engaged by the retainer ring 16 which thus serves to keep the nose ring 14 and the bearing elements 15 within the locknut 13. With this arrangement, the bearings 15 are disposed at an axial position which is the same as that of the groove 22, with respect to the rotational axis of the chuck 10. The flange 29 of the nose ring 14 radially overlaps the flange 25 of the locknut 13, while the bearing race 26 is radially further out than is the bearing race 30. With this arrangement, when the nut 13 is tightened, there is a force that is transmitted by the locknut 13, through the bearings 15, and to the bearing race 30, through the nose ring 14 and on to the spherical surface 23. Thus, the nose ring 14 is subjected only to a compressional force, and the direction of that force is substantially at 45° to the rotational axis of the chuck 10. The axial vector of this force urges the collet 12 in an axial direction to compress it, and the radial vector adds to the grip of the collet. As such compression takes place, the nose ring 14 accommodates itself to the extent necessary by slightly rocking so as to equalize or so as to shift its point of engagement which actually is a line of contact that encircles the rotational axis.

When the locknut 13 is rotated in the opposite direction, the retainer 16 acts through the nose ring 14 and the surfaces 28, 24 to shift the collet 12 in an axially outward direction.

Various reversals of design from that illustrated will be readily apparent to those skilled in this art. For instance, it does not matter whether the threads 18 are internal or external threads. Further, although the present form is preferred, the relationship between the surfaces 23 and 27 can also be modified, just so there is a tangential line of contact.

I have found that a collet chuck assembly constructed as herein disclosed meets the objects set forth herein.

Although various minor modifications might be suggested by those versed in the art, it should be understood that I wish to embody within the scope of the patent warrented hereon, all such embodiments as reasonably and properly come within the scope of my contribution to the art.

I claim as my invention:

1. A chuck comprising:
   a. a housing having a cam surface;
   b. a collet arranged to be contracted in response to axial movement against said cam surface, said collet having a peripheral groove axially remote from said cam surface;
   c. a locknut having threaded engagement with said housing, and having a radially inwardly projecting flange serving as a bearing race;
   d. a nose ring disposed within said locknut and extending radially inwardly into said collet groove, said nose ring having generally opposite first and second portions engageable with said collet at opposite sides of said groove, and a third portion comprising a radially outwardly projecting flange serving as a bearing race, and radially overlapping said locknut flange;
   e. a series of bearings trapped between and engaging said bearing races; and
   f. a removable retainer ring in said locknut for holding said nose ring and bearings within said locknut, and for transmitting a thrust from said locknut to said nose ring to move the collet axially away from said cam surface.

2. A chuck according to claim 1 in which said collet groove is defined at one side by a spherical surface having a line of contact with said nose ring.

3. A chuck according to claim 2 in which said nose ring has a frusto-conical surface forming part of one of said first and second portions, and engaging said spherical surface.

4. A chuck according to claim 2 in which said threaded engagement is provided by loosely fitting threads for enabling said line of contact to seek its own position.

5. A chuck according to claim 1 in which said bearings and said collet provide solely compressional forces on said nose ring in response to tightening of said locknut.

6. A chuck according to claim 1 in which the engagement between said nose ring portion and said collet, for moving said collet against said cam surface, is substantially at an angle of 45° to the axis of rotation of the chuck.

7. A chuck according to claim 1 in which the engagement between said nose ring portion and said collet, for moving said collet against said cam surface, is tangential to form a line of contact encircling the axis of rotation of the chuck.

8. A chuck according to claim 1 in which said bearings and said collet groove are axially aligned with each other.

* * * * *